United States Patent
Bohler et al.

(10) Patent No.: US 9,944,519 B2
(45) Date of Patent: *Apr. 17, 2018

(54) LED-BASED LIGHT BULB

(75) Inventors: Christopher L. Bohler, North Royalton, OH (US); Boris Kolodin, Beachwood, OH (US); Emil Radkov, Euclid, OH (US); Srinath K. Aanegola, Broadview Heights, OH (US); Stanton E. Weaver, Jr., Northville, NY (US); James T. Petroski, Parma, OH (US); Zena Brown, Beachwood, OH (US)

(73) Assignee: GE Lighting Solutions, LLC, Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/424,835

(22) Filed: Mar. 20, 2012

(65) Prior Publication Data

US 2012/0230012 A1 Sep. 13, 2012

Related U.S. Application Data

(63) Continuation of application No. 10/555,721, filed as application No. PCT/US2004/014414 on May 5, 2004.

(Continued)

(51) Int. Cl.
*F21V 3/00* (2015.01)
*B82Y 10/00* (2011.01)
(Continued)

(52) U.S. Cl.
CPC ............... *B82Y 10/00* (2013.01); *F21K 9/23* (2016.08); *F21K 9/232* (2016.08); *F21K 9/64* (2016.08);
(Continued)

(58) Field of Classification Search
CPC .......... F21V 3/00; F21V 3/005; F21V 3/0454; F21V 23/004; F21V 29/02; F21V 29/22;
(Continued)

(56) References Cited

U.S. PATENT DOCUMENTS 2,295,863 A * 9/1942 Paradis .................. 362/227
4,630,183 A * 12/1986 Fujita ................ 362/311.05
(Continued)

FOREIGN PATENT DOCUMENTS

CN 1359137 A * 7/2002
GB 2366610 A * 3/2002
(Continued)

OTHER PUBLICATIONS

Office Action issued in connection with Japanese Application No. 2011-110613.

*Primary Examiner* — William Carter
(74) *Attorney, Agent, or Firm* — Fay Sharpe LLP

(57) ABSTRACT

A light source (10) comprises a light engine (16), a base (24), a power conversion circuit (30) and an enclosure (22). The light engine (16) comprises at least one LED (12) disposed on a platform (14). The platform (14) is adapted to directly mate with the base (24) which a standard incandescent bulb light base. Phosphor (44) receives the light generated by the at least one LED (12) and converts it to visible light. The enclosure (22) has a shape of a standard incandescent lamp.

9 Claims, 3 Drawing Sheets

Related U.S. Application Data

(60) Provisional application No. 60/467,925, filed on May 5, 2003.

(51) Int. Cl.

| | | |
|---|---|---|
| *F21V 29/70* | (2015.01) | |
| *F21V 29/02* | (2006.01) | |
| *F21V 29/58* | (2015.01) | |
| *F21K 9/23* | (2016.01) | |
| *F21K 9/232* | (2016.01) | |
| *F21K 9/64* | (2016.01) | |
| *F21Y 105/00* | (2016.01) | |
| *F21V 29/63* | (2015.01) | |
| *F21K 9/61* | (2016.01) | |
| *F21Y 115/10* | (2016.01) | |

(52) U.S. Cl.
CPC .............. *F21V 29/02* (2013.01); *F21V 29/58* (2015.01); *F21V 29/70* (2015.01); *F21K 9/61* (2016.08); *F21V 3/00* (2013.01); *F21V 29/63* (2015.01); *F21Y 2105/00* (2013.01); *F21Y 2115/10* (2016.08)

(58) Field of Classification Search
CPC ............. F21V 29/2206; F21V 29/2268; F21V 29/262; F21V 29/025; F21V 29/027; H01J 61/52; H01J 61/523
USPC ... 362/27, 84, 228, 230, 231, 234, 235, 240, 362/249.01, 249.02, 249.06, 363, 800, 362/373; 313/11–13, 45, 46; 359/642
See application file for complete search history.

(56) References Cited

U.S. PATENT DOCUMENTS

| | | | |
|---|---|---|---|
| 5,504,666 A * | 4/1996 | Carmichael | 362/294 |
| 5,821,695 A * | 10/1998 | Vilanilam et al. | 315/58 |
| 5,890,794 A * | 4/1999 | Abtahi et al. | 362/294 |
| 6,227,685 B1 * | 5/2001 | McDermott | 362/318 |
| 6,246,459 B1 * | 6/2001 | Simhambhatla | G02F 1/133308 349/149 |
| 6,350,041 B1 * | 2/2002 | Tarsa et al. | 362/231 |
| 6,443,597 B1 * | 9/2002 | Natori | 362/304 |
| 6,499,860 B2 * | 12/2002 | Begemann | F21K 9/135 362/230 |
| 6,504,301 B1 * | 1/2003 | Lowery | F21V 9/00 362/800 |
| 6,621,716 B2 * | 9/2003 | Edwards et al. | 361/803 |
| 6,659,632 B2 * | 12/2003 | Chen | 362/545 |
| 6,734,465 B1 * | 5/2004 | Taskar et al. | 257/80 |
| 6,736,526 B2 * | 5/2004 | Matsuba et al. | 362/260 |
| 6,774,584 B2 * | 8/2004 | Lys et al. | 315/362 |
| 6,791,151 B2 * | 9/2004 | Lin et al. | 257/434 |
| 6,796,698 B2 * | 9/2004 | Sommers et al. | 362/555 |
| 6,864,513 B2 * | 3/2005 | Lin et al. | 257/99 |
| 6,953,952 B2 * | 10/2005 | Asakawa | 257/103 |
| 6,967,448 B2 * | 11/2005 | Morgan et al. | 315/295 |
| 7,301,346 B2 * | 11/2007 | Annighoefer et al. | 324/414 |
| 8,439,528 B2 | 5/2013 | Lenk et al. | |
| 2001/0014019 A1 * | 8/2001 | Begemann | 362/231 |
| 2003/0040200 A1 * | 2/2003 | Cao | F21V 3/00 362/240 |
| 2003/0185005 A1 * | 10/2003 | Sommers et al. | 362/240 |
| 2003/0189829 A1 * | 10/2003 | Shimizu et al. | 362/240 |
| 2003/0189830 A1 * | 10/2003 | Sugimoto et al. | 362/294 |
| 2003/0227774 A1 * | 12/2003 | Martin et al. | 362/240 |
| 2004/0029069 A1 * | 2/2004 | Gill | A61C 19/004 433/29 |
| 2004/0066142 A1 * | 4/2004 | Stimac et al. | 315/50 |
| 2005/0052885 A1 * | 3/2005 | Wu | 362/565 |
| 2005/0174780 A1 * | 8/2005 | Park | 362/294 |

FOREIGN PATENT DOCUMENTS

| | | |
|---|---|---|
| JP | 63-102266 | 7/1988 |
| JP | 63-198086 | 12/1988 |
| JP | 2002-304902 | 10/2002 |
| JP | 2002-329401 | 11/2002 |
| JP | 2002329401 A * | 11/2002 |

* cited by examiner

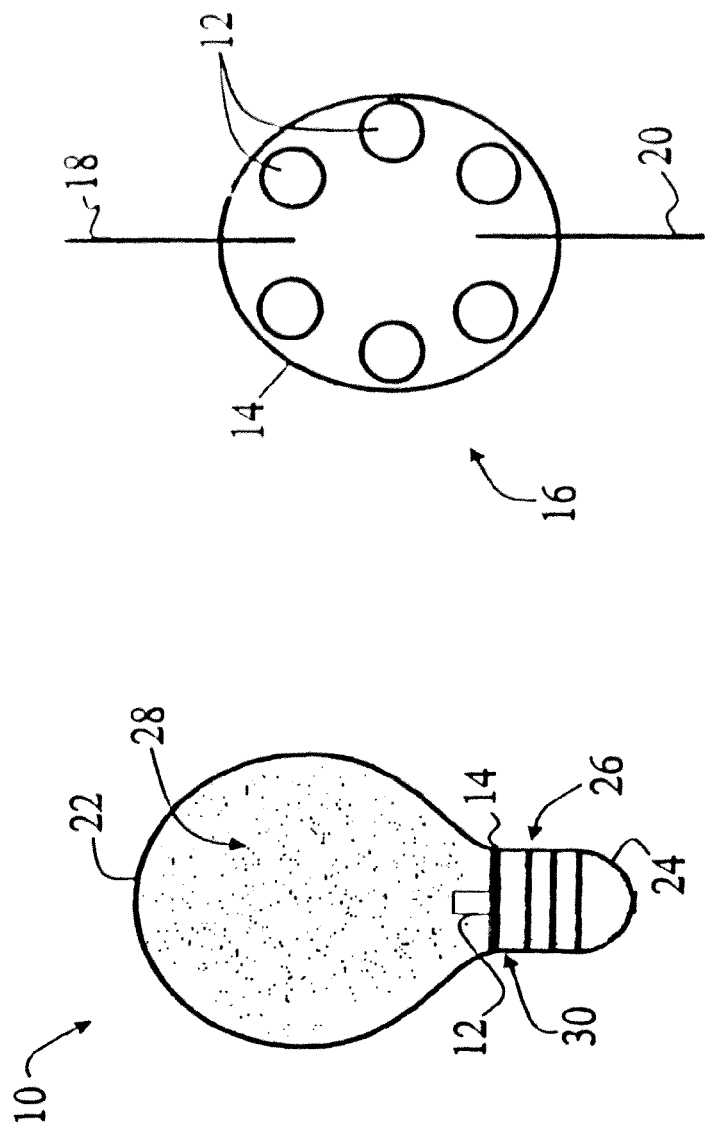

LED-BASED LIGHT BULB

This application is a continuation of U.S. patent application Ser. No. 10/555,721 which claims priority to U.S. provisional patent application Ser. No. 60/467,925 filed May 5, 2003. Both of the aforementioned patent applications are incorporated by reference herein.

BACKGROUND

The present application relates to the art of LED lighting systems. It finds particular application in the light packages traditionally employed in an incandescent light source and will be described with particular reference thereto. Those skilled in the art will appreciate the applicability of the present invention to the applications where a use of an LED light source in a traditional bulb light package can provide advantages such as increased durability, light output stability and energy savings.

Typically, incandescent light bulb packages utilize a light source that includes an incandescent filament within a glass enclosure. However, the incandescent filaments are fragile and tend to gradually degrade during lifetime of a bulb causing the useful light output generated by the filaments to decrease over time. The increasing fragility of the filament with age eventually leads to breakage. Typical incandescent light bulbs have a mean life of 500 to 4,000 hours.

Light emitting diodes (LEDs) present an attractive alternative as a light source in a light bulb package. A low-power, solid-state LED light could last up to 100,000 hours (eleven years), far outdistancing the life of a typical incandescent bulb. When the LED degrades to half of its original intensity after 100,000 hours, it continues operating with a diminished output. In the state of operation with the diminished output, the LEDs are still ten times more energy-efficient than incandescent bulbs, and about twice as efficient as fluorescent lamps. Besides producing little heat and being energy-efficient, LEDs are solid-state devices with no moving parts. LEDs characteristics do not change significantly with age, and they are not easily damaged by shock or vibration. This makes LED lighting systems very reliable. The small shape and low heat generated by the LEDs enables lighting systems to take on various shapes and sizes.

A widespread use of the LED lighting systems have been limited because the consumers are accustomed to seeing and purchasing the traditional bulb lights. The number of various bulb light packages on the market is tremendous. In addition to the unique cosmetic appearance, the packages differ in luminescent levels, color temperatures, electrical requirements, and other characteristics. One approach been to directly retrofit the LED into the existing light package. However, the single LED does not produce the light output of the same optical characteristics as each existing incandescent bulb lamp. In addition, the LEDs emit highly directional light resulting in a narrow light angle and require different input power.

The present invention provides a new LED lamp.

BRIEF DESCRIPTION

According to one aspect of the application, a light source is disclosed. A light engine generates light of one of a plurality of wavelengths. The light engine includes a platform and at least one LED disposed on the platform. An enclosure surrounds a light generating area of the light engine. A base includes a heat sink for conducting thermal energy away from the at least one LED. The light engine is mounted onto a heat sink. A conversion circuit supplies electric power to the light engine.

One advantage of the present application resides in providing a common light engine that is used across various bulb platforms.

Another advantage resides in providing an adaptable and scalable LED lamp design.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 1 schematically shows a cross-section of an LED-based lamp;

FIG. 2 schematically shows a top view of a platform including LEDs;

DETAILED DESCRIPTION

Figure 3:
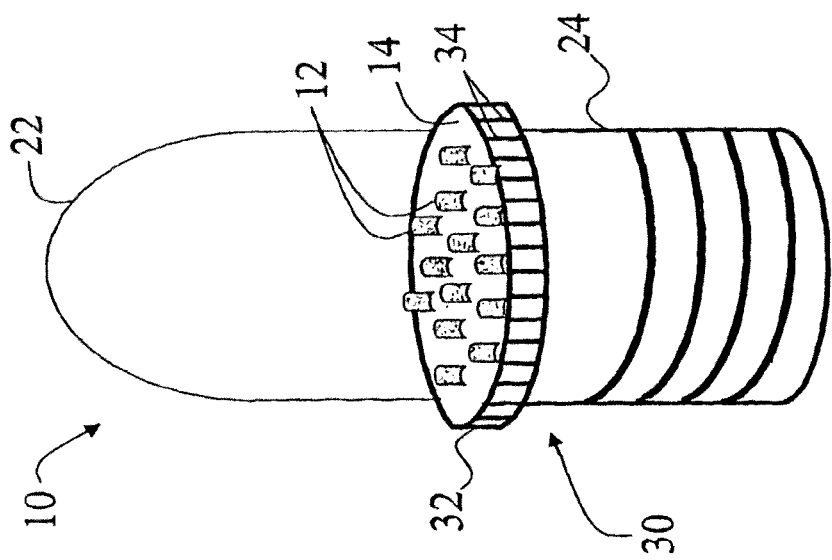
FIG. 3 schematically shows a cross-section of an LED-based lamp which includes a heat dissipating slug.

With reference to FIGS. 1 and 2, a lighting system 10 includes one or more LEDs 12 which are positioned on a mounting platform 14, defining a light engine 16. Wire leads 18, 20 are provided for powering the LEDs 12. The LEDs 12 is one of inorganic and organic light emitting devices which emit light in a spectrum from UV to infrared. Variations in optical performance, viewing angles, and intensity levels are achieved by arranging the LEDs in different patterns. The lighting system 10 includes a light cover or enclosure 22. Preferably, the enclosure 22 is a traditional bulb-shaped enclosure. Optionally, the enclosure 22 is a custom built enclosure to provide non-uniform light output to create special visual effects. It is contemplated that the enclosure 22 can be spherical, elliptical, cylindrical, domed, squared, n-sided, or any other shape. Preferably, the enclosure 22 is built of light transparent or translucent materials, or a combination thereof. The enclosure 22 materials are selected from glass, plastic, acrylic, polycarbonate, or other suitable materials.

Preferably, the platform 14 is a substrate on which a semiconductor may be grown. The platform 14 can be one of sapphire, gallium arsenide, silicon carbide, gallium phosphorous, gallium arsenide, gallium nitride, or other suitable material. It is also contemplated that the platform 14 can be a printed circuit board, heatsink, or any other suitable means for mounting the LEDs 12. The LEDs 12 are attached to the platform 14 by one of solder, wirebonding, thermosonic, thermocompression, electrical conductive adhesives, thermal conductive adhesives, other suitable means, or a combination of the above. It is also contemplated that the LEDs 12 can be adjacent to or manufactured as an integral part of the cover 22.

The platform 14 is adapted to be directly mounted into a base or socket 24. In one embodiment, the base 24 has a receptacle into which the light engine 16 is plugged in. Preferably, the base 24 is one of the commercially available light bulb sockets for easy field exchange and retrofitting of the light bulb with the LED light engine 16 such that the enclosure 22 can be fitted over the light engine 16. E.g., in one embodiment, the base 24 is one of commercially available incandescent light sockets such as 6S6 screw base, 194 wedge base, or other. Such design allows the conventional lamp to be replaced with a variety of different LED light engines without modification to the lamp socket or to the lamp enclosure. Optionally, the base 24 is custom manufactured. At least one heatsink 26 is integrally disposed in thermal communication with the light engine 16 and the base 24 to take the heat away from the LEDs 12. The heatsink 26 is constructed from the material capable of conducting the heat away from the LEDs 12. Examples of suitable materials include copper, aluminum, silicon carbide, boron nitride and others known to have a high coefficient of thermal conductivity.

Preferably, an index matching material 28 is applied to encompass the light engine 16 to improve the light extraction. The index matching material is selected from silicones, acrylics, epoxies, thermoplastics, glasses and any other appropriate materials. Optionally, an index matching fluid, which preferably serves as a thermal spreading medium, is present between the light engine 16 and the cover 22. The fluid is selected from solids, gels, liquids, fluorocarbon coolants, luminescent materials and others to create a desired visual effect. Additionally, reflective or translucent particles may added to the fluid for further visual effects. The cover 22 works together with the internal fluid to optimize light extraction and/or provide visual effects. In one embodiment, the index matching material 28 is structured to provide lensing.

In order to provide suitable electrical power to the LEDs 12, the lighting system 10 includes one or more of an electric power conversion circuit, or control electronics, or power electronics circuits 30, which are preferably integrated with the light engine 16. Alternatively, the electric power conversion circuit 30 can be adjacent the light engine 16, located within the base 24, or disposed remotely from the lighting system 10. In one embodiment, the electric power conversion circuit includes an AC/DC converter which permits the LED-based lighting system 10 to be powered by a standard domestic 120 VAC or international 220 VAC user voltage. Such circuitry makes the LED lamp a true replacement for a bulb light. Preferably, the power electronics circuits 30 are two- or three-dimensional structures to provide minimal dimensions. In one embodiment, the electric power conversion circuits 30 are flexible circuits. Optionally, the electric power conversion circuits 30 are non-planar circuit boards.

With reference to FIG. 3, the lighting system 10 includes a heat dissipating slug 32. The heat dissipating slug 32 is disposed in a thermal communication with the base 24 to conduct the heat from the light en e 16 into the base 24. Optionally, the heat dissipating slug 32 transfers the heat from the light engine 16 into the air. Preferably, the heat dissipating slug 32 includes a plurality of radial fins 34 disposed about an outer periphery of the slug 32.

Figure 4:
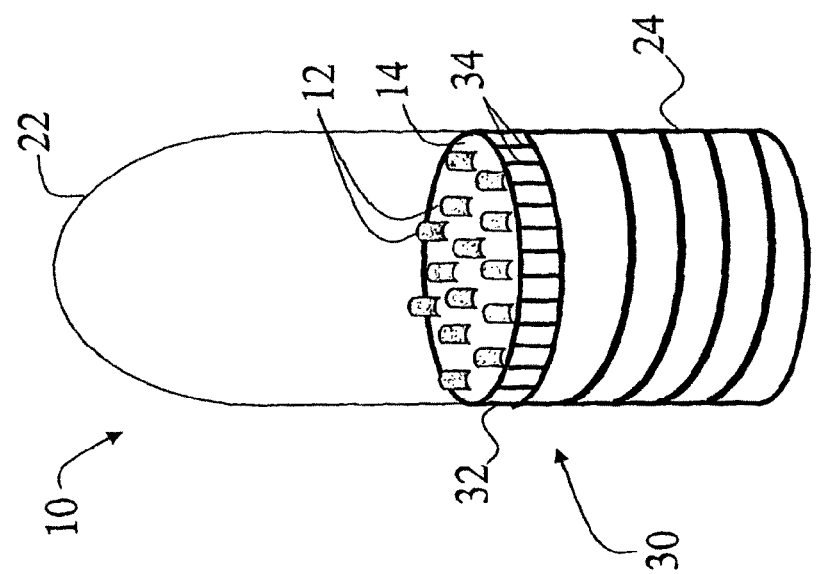
FIG. 4 schematically shows a cross-section of an LED-based lamp which includes an extended heat dissipating slug.

With reference to FIG. 4, the heat dissipating slug 32 extends beyond the base 24 to transfer the heat from the light engine 16 into the air.

Optionally, the base 24 includes at least one of thermoelectric cooling, piezo synthetic jets, qu-pipes, heat-pipes, piezo fans and electric fans, or other forms of active cooling.

Figure 6:
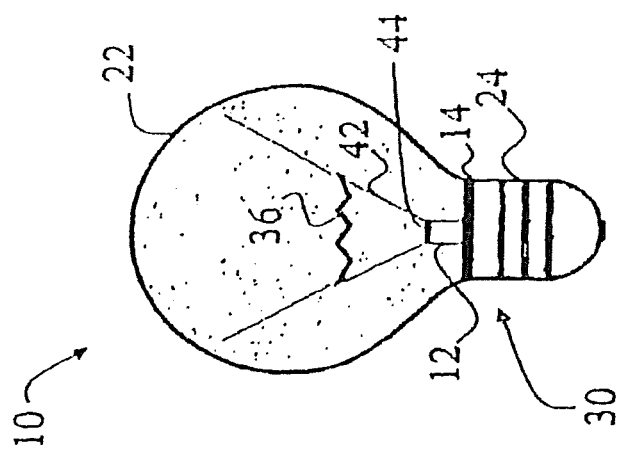
FIG. 6 schematically shows a cross-section of an LED-based lamp which includes a filament light guide.
Figure 5:
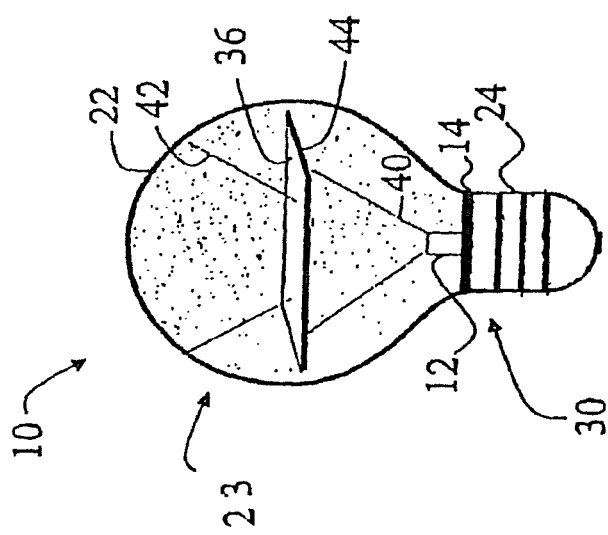
FIG. 5 schematically shows a cross-s LED-based lamp which includes a phosphor panel.

With reference to FIGS. 5 and 6, the lighting system 10 includes a wavelength converting material such as organic or inorganic phosphor. The phosphor can be located in any suitable location, such as integrated into the LED 12, at a light guide 36, coated inside or outside the cover 22, contained within the cover 22, or a combination thereof.

In one embodiment, the enclosure 22 includes transparent organic phosphors 23 which are preferably coated on an inside, or outside surface of the enclosure 22, or a combination thereof. It is also contemplated that the phosphors can be dissolved, melted, coextruded, or dispersed by any other means within the walls forming the enclosure 22. Preferably, the phosphor distribution is uniform. In one embodiment, the phosphor distribution is non uniform to create preselected patterns, figures, special visual effects of different colors, and other effects. It is also contemplated that both transparent and conventional non-transparent phosphors can be used to create special effects, patterns, or figures. In one embodiment, the enclosure 22 is frosted or otherwise treated to provide special visual effects. Examples of the organic transparent phosphors are the BASF Lumogen F dyes such as Lumogen F Yellow 083, Lumogen F Orange 240, Lumogen F Red 300, and Lumogen F Violet 570. Of course, it is also contemplated that other phosphors such as the rare earth complexes with organic component described in the U.S. Pat. No. 6,366,033; quantum dot phosphors described in the U.S. Pat. No. 6,207,229; nanophosphors described in the U.S. Pat. No. 6,048,616, or other suitable phosphors can be used.

With continuing reference to FIG. 5, the UV light rays 40 are emitted by the LEDs 12 and converted into white or visible light 42 by a phosphor 44. The phosphor 44 preferably includes two or more phosphors to convert the emitted light 40 to the visible light 42, although single component phosphors are embodied for saturated color light generation as well. The visible light 42 exits through the enclosure 22. In this embodiment, the phosphor mix 44 is disposed about or within a light guide 36 which is a planar panel disposed above the LED 12 such that the majority of the light rays 40 strike the panel.

With reference again to FIG. 6, the light guide 36 is a filament which is disposed within the enclosure 22 to create a "filament-look" LED based lighting system. More specifically, phosphor 44 is applied directly to the LED 12 such that the emitted light 40 is converted into visible light 42 at the LED 12. The visible light 42 strikes the light guide 36 and adapts the filament shape to simulate a "filament-look" light bulb. Alternatively, a suspended reflector may be used to simulate the filament shape. The reflector can be "wadded" tin foil, a coiled aluminized spring, or the like. Optionally, the light guide 36 is a coiled fiber optic with surface, internal, or other diffusers, such as frustrated TIR (Total Internal Reflection) diffusers, to allow the light to escape at the desired locations.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

The invention claimed is:

1. A light source comprising:
   a light engine comprising a printed circuit board and including at least one LED;
   a light transparent or translucent enclosure fitted over at least a portion of the light engine;
   an index matching and thermal spreading material in the enclosure and in direct physical contact with the at least one LED, said material consisting of a liquid;
   a base for supporting the light engine, enclosure and a heat sink in operative arrangement; and
   a conversion circuit housed in at least a portion of the base for supplying electric power to the light engine.

2. The light source of claim 1, wherein the liquid material comprises a lens.

3. The light source of claim 1, wherein the enclosure is one of a bulb, spherical, elliptical, cylindrical, domed, squared, and n-sided shaped.

4. The light source of claim 1, wherein the base is one of a screw base and wedge base.

5. The light source of claim 1, wherein the heat sink is in thermal communication with the light engine and comprises i) a slug portion and ii) a plurality of radially extending fins disposed about the outer periphery of the slug portion and external to the light source to transfer heat from the light engine into ambient air external to the light source.

6. The light source of claim 1, wherein the base comprises an active cooling unit for dissipating thermal energy away from the at least one LED.

7. The light source of claim 6, wherein the active cooling unit includes at least one of thermoelectric cooling, piezo synthetic jets, piezo fans and electric fans.

8. The light source of claim 1 wherein said light engine comprises a plurality of LEDs and all LEDs of the light engine reside in a common plane.

9. The light source of claim 1 wherein said conversion circuit is in electrical communication with a voltage source.

* * * * *